United States Patent
Miyamura

(10) Patent No.: US 8,159,768 B1
(45) Date of Patent: Apr. 17, 2012

(54) DETECTING A SERVO ADDRESS MARK (SAM) IN A SERVO FIELD SYNC-UP OPERATION

(75) Inventor: Masao Miyamura, Diamond Bar, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 966 days.

(21) Appl. No.: 12/146,040

(22) Filed: Jun. 25, 2008

(51) Int. Cl.
G11B 5/09 (2006.01)
G11B 5/596 (2006.01)
(52) U.S. Cl. .................... 360/51; 360/48; 360/77.08
(58) Field of Classification Search .................. None
See application file for complete search history.

(56) References Cited

U.S. PATENT DOCUMENTS

| | | | |
|---|---|---|---|
| 4,851,933 A | 7/1989 | Sugaya et al. | |
| 5,036,408 A | 7/1991 | Leis et al. | |
| 5,588,030 A | 12/1996 | Riggle et al. | |
| 5,793,548 A | 8/1998 | Zook | |
| 5,966,259 A * | 10/1999 | Mitsuishi et al. | 360/48 |
| 6,594,094 B2 * | 7/2003 | Rae et al. | 360/25 |
| 6,943,981 B2 | 9/2005 | Ehrlich | |
| 6,995,935 B2 | 2/2006 | Ehrlich | |
| 7,006,312 B2 | 2/2006 | Ehrlich | |
| 7,006,315 B2 | 2/2006 | Ehrlich | |
| 7,046,465 B1 | 5/2006 | Kupferman | |
| 7,072,128 B2 | 7/2006 | Ehrlich | |
| 7,075,742 B2 | 7/2006 | Ehrlich | |
| 7,092,177 B2 | 8/2006 | Ehrlich | |
| 7,142,379 B2 | 11/2006 | Tsuchinaga | |
| 7,167,328 B2 | 1/2007 | Annampedu et al. | |
| 2005/0063088 A1 | 3/2005 | Ehrlich | |
| 2005/0243455 A1 | 11/2005 | Annampedu | |

* cited by examiner

Primary Examiner — Daniell L Negron
Assistant Examiner — Regina N Holder

(57) ABSTRACT

A method for detecting a servo address mark (SAM) of a servo sector of a disk of a disk drive during a servo field sync-up operation is disclosed. The method includes: detecting a start of a preamble; opening a SAM search window to detect the SAM; and continuing to detect the presence of the preamble during a SAM search time period. Further, the method discloses that: if the preamble is detected, the SAM search window is continued; and if the preamble is not detected, and the SAM is not detected, the SAM search window is closed.

26 Claims, 6 Drawing Sheets

DETECTING A SERVO ADDRESS MARK (SAM) IN A SERVO FIELD SYNC-UP OPERATION

BACKGROUND OF THE INVENTION

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk.

Each servo sector typically includes at least a phase locked loop (PLL) field, a servo address mark (SAM) field, a track identification (TKID) field, a sector ID field having a sector ID number to identify the sector, and a group of servo bursts (e.g. an alternating pattern of magnetic transitions) that the servo control system of the disk drive samples to align the moveable transducer head with or relative to a particular track. Typically, the servo control system moves the transducer head toward a desired track during a "seek" mode using the TKID field as a control input. Once the moveable transducer head is generally over the desired track, the servo control system uses the servo bursts to keep the moveable transducer head over that track in a "track follow" mode.

In order to perform these seeking and tracking operations by the servo controller, a servo field sync-up operation needs to be performed by the read/write channel to detect a servo sector. For example, when a disk drive is powered-up, the head of the disk drive attempts to detect a servo sector as part of a servo field sync-up operation in which a SAM search loop is performed.

In this method, the head attempts to detect a servo preamble, such as a phase locked loop (PLL) field having a known 2T pattern, which allows for the read/write channel to recover the timing and gain of the written servo sector. Once a servo sector is identified, the signal timing and gain information can be obtained from the known PLL pattern and the servo sector fields can be detected.

In order to accomplish this, a SAM search loop is implemented by the read/write channel once a preamble is identified. Unfortunately, the SAM search loop may be implemented due to an incorrectly identified preamble. Because the SAM search loop is turned-on for a fixed time duration, when the SAM search loop duration expires, there may not be enough time to re-trigger the next SAM search loop to detect a SAM. There is therefore a need for a method and a disk drive that addresses these limitations.

DETAILED DESCRIPTION

Figure 1:
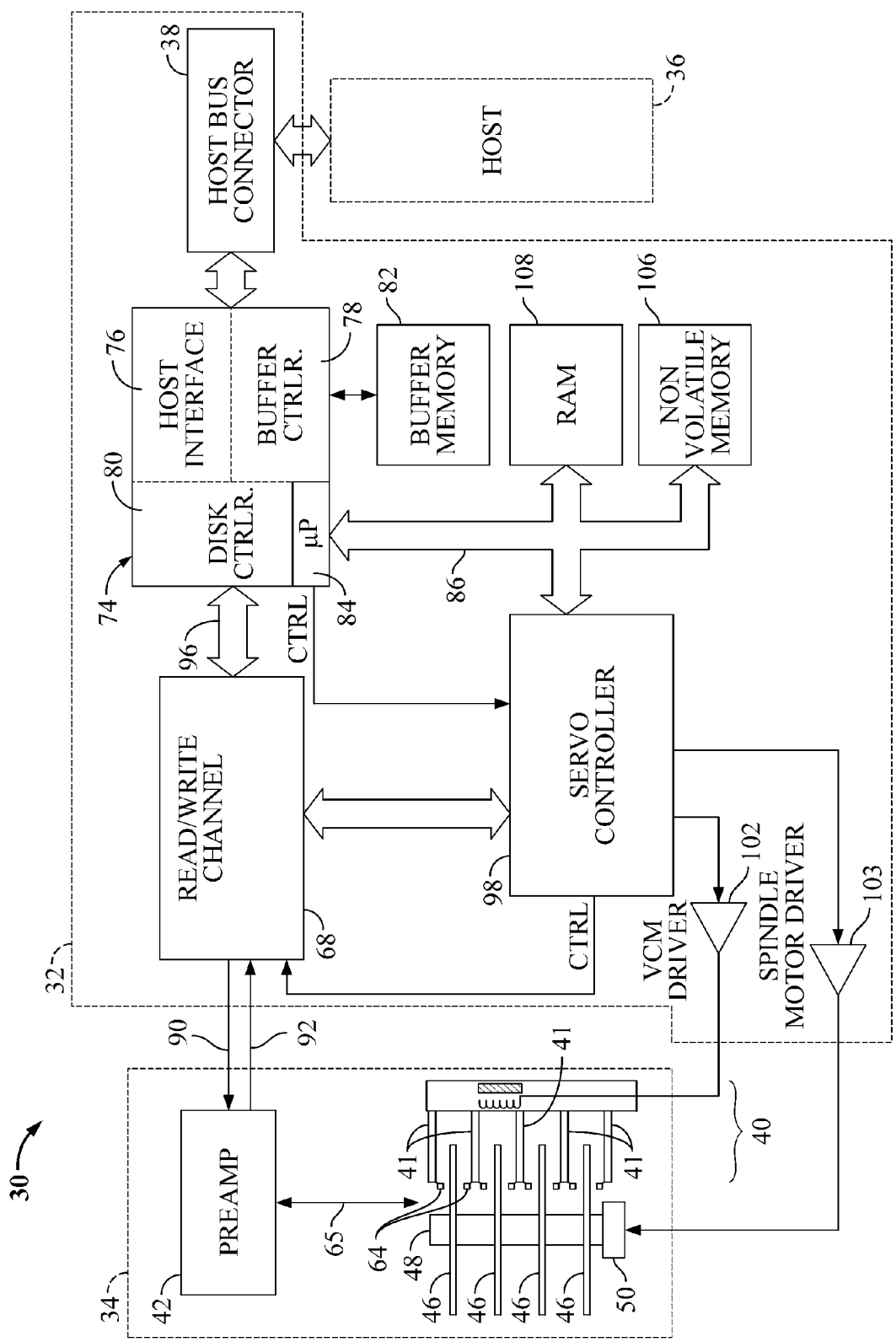
FIG. 1 shows a simplified block diagram of a disk drive in which embodiments of the invention may be practiced.

FIG. 1 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device such as a desktop computer, a laptop computer, a server computer, a mobile computing device (e.g. PDA, camera, cell-phone, etc.), or any type of computing device. Alternatively, host 36 may be a test computer that performs calibration and testing functions as part of the disk drive manufacturing process. Disk drive 30 may be of a suitable form factor and capacity for computers or for smaller mobile devices (e.g. a small form factor (SFF) disk drive).

HDA 34 comprises: one or more disks 46 for data storage; a spindle motor 50 for rapidly spinning each disk 46 (four shown) on a spindle 48; and an actuator assembly 40 for moving a plurality of heads 64 over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include a read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as may be needed for execution.

During disk read and write operations, data transferred by preamplifier 42 may be encoded and decoded by read/write channel 68. During read operations, read/write channel 68 may decode data into digital bits transferred on an NRZ bus 96 to HIDC 74. During write operations, HIDC may provide digital data over the NRZ bus to read/write channel 68 which encodes the data prior to its transmittal to preamplifier 42. As one example, read/write channel 68 may employ PRML (partial response maximum likelihood) coding techniques, although other coding processes may also be utilized.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo sectors are recorded on each track of each disk 46. Data sectors are recorded in the intervals between servo sectors on each track. Servo sectors are sampled at regular intervals by servo controller 98 to provide servo position information to microprocessor 84. Servo sectors are received by read/write channel 68, and are processed by servo controller 98 to provide position information to microprocessor 84 via bus 86.

Figure 2:
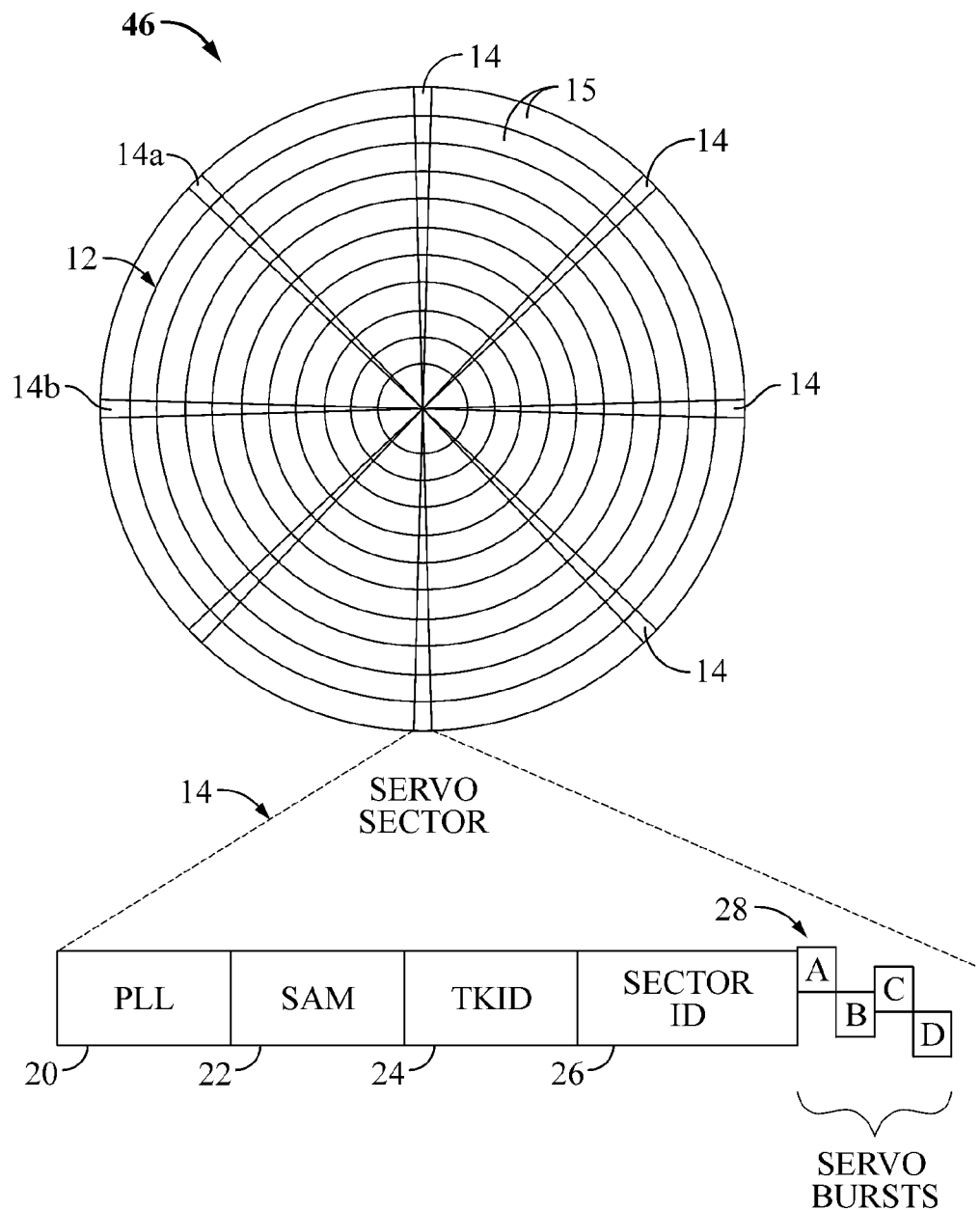
FIG. 2 shows a disk of a disk drive having servo sectors according to one embodiment.

FIG. 2 shows a disk 46 of disk drive 30 of FIG. 1 having a plurality of concentric tracks, and more particularly, illustrates a disk 46 that includes servo sectors 14 in accordance with one embodiment of the invention. The plurality of servo sectors 14 are servo-written circumferentially around disk 46 to define circumferential tracks 12 and are utilized in seeking and track following. In particular, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 may include: a phase lock loop (PLL) field 20, a servo address mark (SAM) field 22, a track identification (TKID) field 24, a sector identifier (ID) field 26; and a group of servo bursts (e.g. ABCD) 28 (e.g. an alternating pattern of magnetic transitions) that the servo control system samples to align the moveable transducer head with, and relative to, a particular track. Typically, servo controller 98 moves the transducer head 64 toward a desired track during a "seek" mode using the TKID field 24 as a control input. In order to perform seeking and track following operations by servo controller 98, a servo field sync-up operation is performed by the read/write channel 68 to detect a servo sector 14.

A preamble—such as the phase lock loop (PLL) field 20—is generally read first by the read/write channel 68 as part of a servo field sync-up operation to recover the timing and gain of the written servo sector 14. For example, the PLL field may be written with a 2T pattern, as is well known in the art.

Next, the servo address mark (SAM) 22 is read to facilitate block synchronization. The SAM 22 facilitates block synchronization by acting as a special marker that is detected to "frame" data, i.e., to identify a boundary of a block.

A servo field sync-up operation is implemented by read/write channel 68 of disk drive 30 to establish a precise timing reference point for the reading of servo data. It is well known in the art to utilize a read/write channel to perform a servo field sync-up operation to detect a servo preamble, such as PLL 20, to recover the timing and gain of a written servo sector and to detect the servo sector for servo control operations.

Once head 64 is generally over a desired track 12, servo controller 98 uses the servo bursts (e.g. ABCD) 28 to keep head 64 over the track in a "track follow" mode. During track following mode, head 64 repeatedly reads the sector ID 26 of each successive servo sector to obtain the binary encoded sector ID number that identifies each sector of the track. Based on the TKID and sector ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

Read/write channel 68 may include suitable well-known hardware, circuitry, logic, state machines, etc., or may operate under the control of a program or routine (e.g., firmware, software, etc.) to execute methods or processes in accordance with embodiments of the invention related to detecting a preamble (such as a PLL 20) and a SAM 22 of a servo sector 14 of a disk 46 during a servo field sync-up operation, as will be described hereinafter in more detail.

Read/write channel 68 may perform operations including: detecting the start of a preamble (e.g. such as PLL 20) and opening a SAM search window to detect SAM 22. Generally, the preamble refers to PLL 20, but it should be appreciated that other types of preambles may be utilized. The servo field sync-up operation implemented by read/write channel 68 continues to detect the presence of preamble 22 during a SAM search time period, wherein, if preamble 22 is detected, the SAM search window is continued. However, if preamble 20 is not detected and SAM 22 is not detected, read/write channel 68 closes the SAM search window. Further, if read/write channel 68 determines that the SAM search time period has timed out, read/write channel 68 closes the SAM search window.

By read/write channel 68 closing the SAM search window if a preamble is not detected and a SAM is not detected, a preamble qualification check is provided by the read/write channel during the servo field sync-up process such that the servo field sync-up process can be quickly ended. This is beneficial because the servo field sync-up process may have been incorrectly started, such as by detecting pre-written spiral wedges that were not completely erased as part of writing product servo sectors. Further, a significantly-reduced SAM search time period may be utilized in this process. For example, the read/write channel may close the SAM search window after less than 50 nano-seconds.

Examples of methods for detecting a SAM 22 of a servo sector 14 of a disk 46 of a disk drive 30 during a servo field sync-up operation will be hereinafter discussed. The methods generally include: detecting a start of a preamble 20; opening a SAM search window to detect the SAM; and continuing to detect the presence of the preamble during a SAM search time period. Further, while the preamble continues to be detected, the SAM search window is continued; and if the preamble is not detected, and the SAM is not detected, the SAM search window is closed.

Figure 3:
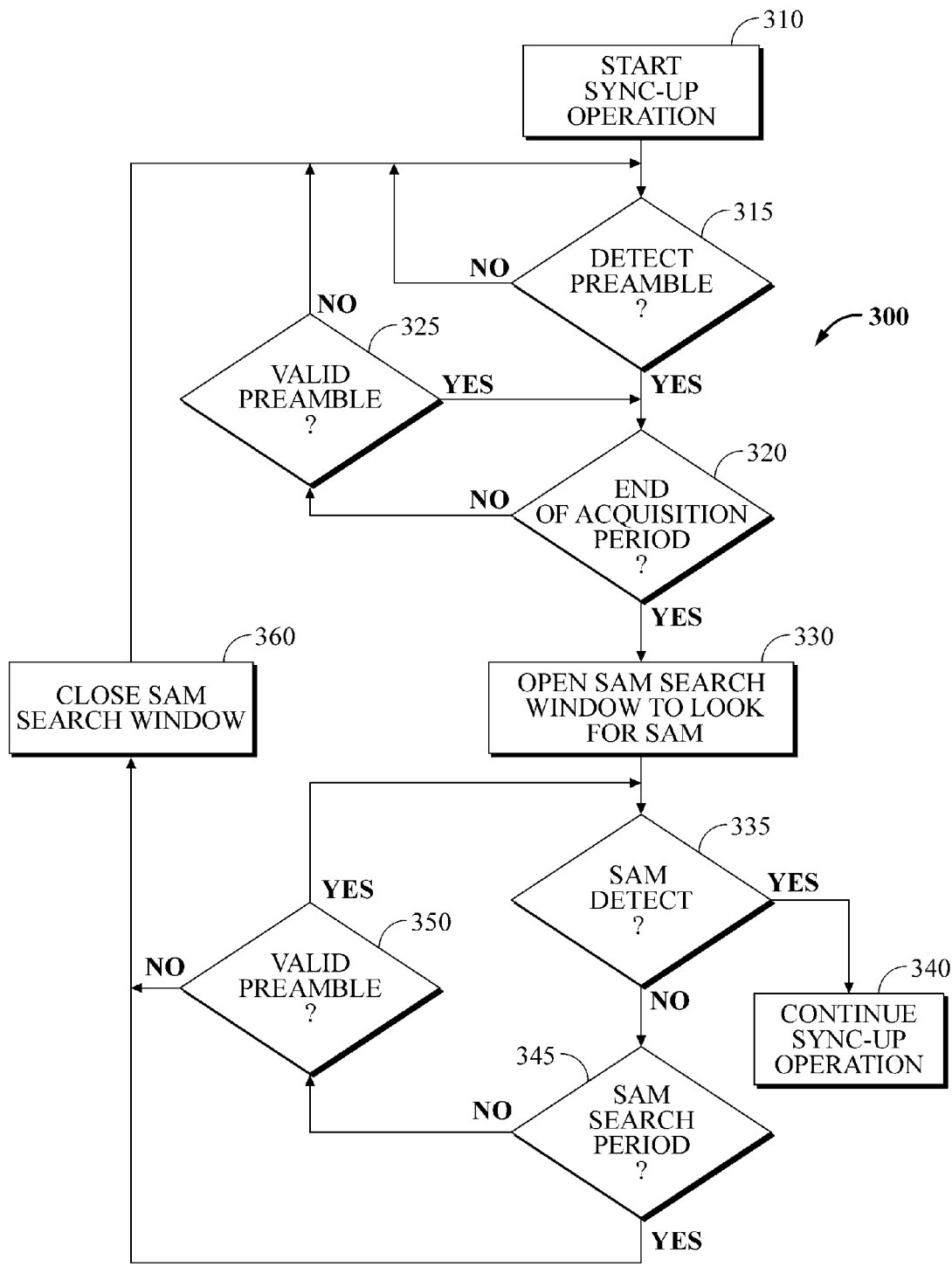
FIG. 3 is a flow diagram illustrating a process that may be utilized to detect a SAM of a servo sector of a disk during a servo field sync-up operation, according to one embodiment of the invention.

FIG. 3 is a flow diagram illustrating a process 300 that may be utilized to detect a SAM of a servo sector of a disk during a servo field sync-up operation with a preamble qualification check, according to one embodiment of the invention. In one embodiment, process 300 may be implemented by read/write channel 68 of disk drive 30.

At block 310, a servo field sync-up operation is performed. At decision block 315, it is determined whether or not a preamble is detected. If not, the servo sync-up operation continues to search for a preamble. If a preamble is detected, an acquisition period is started to determine if an actual preamble has been detected. This is because a portion of the disk may be read that initially indicates that it is a preamble—but it may in fact not be a preamble.

At decision block 320, process 300 determines whether the acquisition period has ended. If not, it is next determined whether or not the preamble is valid (decision block 325). If it is not a valid preamble, the servo sync-up operation begins again. If it may be a valid preamble, the acquisition period continues.

If it is the end of the acquisition period (determined at decision block 320), and the preamble has been determined to be valid, then process 300 moves to block 330 where a SAM search window is opened to look for the SAM.

Next at decision block 335, it is determined whether a SAM has been successfully detected. A SAM may be detected based upon a threshold matching criteria of bits of the SAM (e.g., 3 bits of 9 bits, 4 bits of 9 bits . . . 9 bits of 9 bits). If so, the servo field sync-up operation is continued (block 340). If not, at decision block 345, process 300 determines whether the SAM search period has ended. If the SAM search period has ended, then the SAM search window is closed (block 360) and the servo field sync-operation is restarted.

On the other hand, if the SAM search period has not ended, then at decision block 350 process 300 determines whether or not the preamble continues to be valid. If the preamble is still valid, then the process 300 continues and at decision block 335 it is once again determined whether or not a SAM is detected. However, if it is determined at decision block 350 that the preamble is not valid, then at block 360 the SAM search window is closed and the servo field sync-up operation is restarted.

Figure 4:
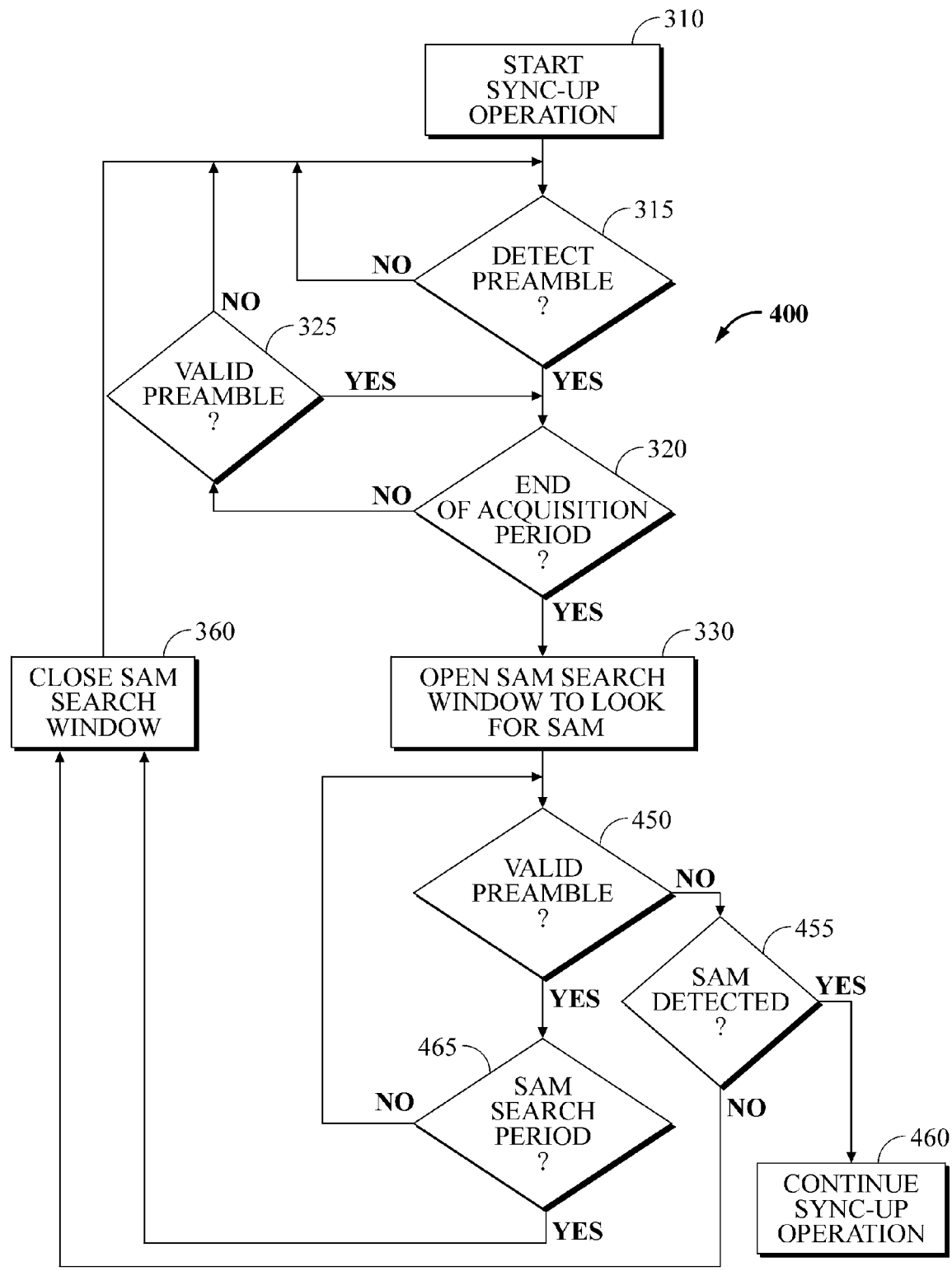
FIG. 4 is a flow diagram illustrating another process that may be utilized to detect a SAM of a servo sector of a disk during a servo field sync-up operation, according to another embodiment of the invention.

FIG. 4 is a flow diagram illustrating another process 400 that may be utilized to implement a servo field sync-up operation, according to another embodiment of the invention. Process 400 is similar to the previously-described process 300 such that common blocks 310, 315, 320, 325, and 330 will not be repeated for brevity's sake.

Starting at block 330, the SAM search window is opened to look for a SAM. At decision block 450, it is determined whether a valid preamble continues to be detected. If not, process 400 moves to decision block 455 to determine whether a SAM has been detected. If so, the servo field sync-up operation is continued (block 460). If not, the SAM search window is closed (block 360) and the sync-up operation is restarted.

On the other hand, if the preamble is determined to be valid, then process 400 moves to decision block 465 to determine whether the SAM search period had ended. If so, the SAM search window is closed (block 360) and the servo field sync-up operation is restarted. On the other hand, if the SAM search period has not expired, then process 400 returns to decision block 450 where it is determined whether or not the preamble remains valid or not.

As previously discussed in detail, process 300 and process 400 describe methods that include: detecting a start of a preamble; opening a SAM search window to detect a SAM; and continuing to detect the presence of the preamble during a SAM search time period. Further, these methods disclose that: if the preamble is detected, the SAM search window is continued; and if the preamble is not detected, and the SAM is not detected, the SAM search window is closed.

Previously-described processes 300 and 400 provide a preamble qualification check during a servo field sync-up process such that the servo field sync-up process can be quickly ended when it is improperly started based upon false preambles, such as those provided by spiral wedges. Further, these methods enable a quick re-trigger of the SAM search following the detections of invalid patterns during the servo field sync-up process. Thus, the SAM search loop is made much more efficient.

Figure 5:
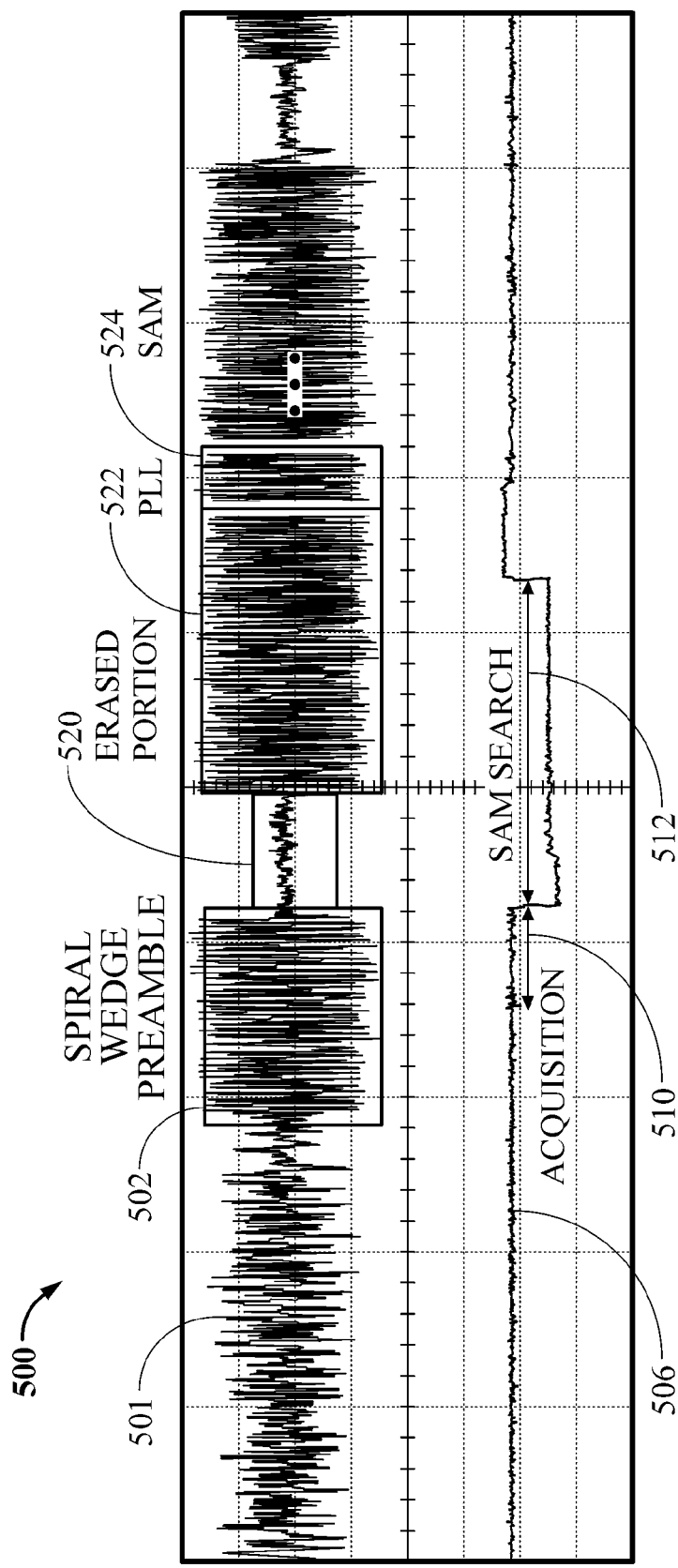
FIG. 5 is a signal representation graph illustrating an example servo field sync-up operation.

FIG. 5 is a signal representation graph 500 illustrating an example servo field sync-up operation. The top graph portion 501 illustrates example signals received by the read/write channel from the head as a servo sector is searched for during the servo field sync-up operation.

In this example, spiral wedge preamble 502, erased portion 520, PLL 522, and SAM 524 signals are received by the read/write channel. Typical servo field sync-up operation signals 506 performed by the read/write channel are shown below. In this example, each x-axis marking is approximately 50 nano-seconds. Note that FIG. 5 illustrates some time delay between the top graph portion 501 and servo-field sync-up operation 506 due to processing time delays.

In the typical servo field sync-up operation 506, a spiral wedge preamble 502 will be detected during the acquisition period 510, and based upon this spiral wedge preamble detection, a SAM search window 512 is opened to detect a SAM. The SAM search time period lasts for approximately 500 nano-seconds.

As shown in FIG. 5, the SAM search window 512 continues over an erased portion 520 and through the actual preamble (PLL 522) of the servo sector and ends just before the actual SAM 524 of the servo sector begins.

In this example servo field sync-up operation, the SAM search window 512 completely misses SAM 524 and there is not enough time to re-trigger the next SAM search loop to detect SAM 524. Thus, by utilizing this typical type of servo field sync-up operation, the SAM field itself is not detected. Further, a relatively large amount of time will be wasted in an attempt to eventually complete a successful sync-up operation and detect a SAM and a servo sector.

Figure 6:
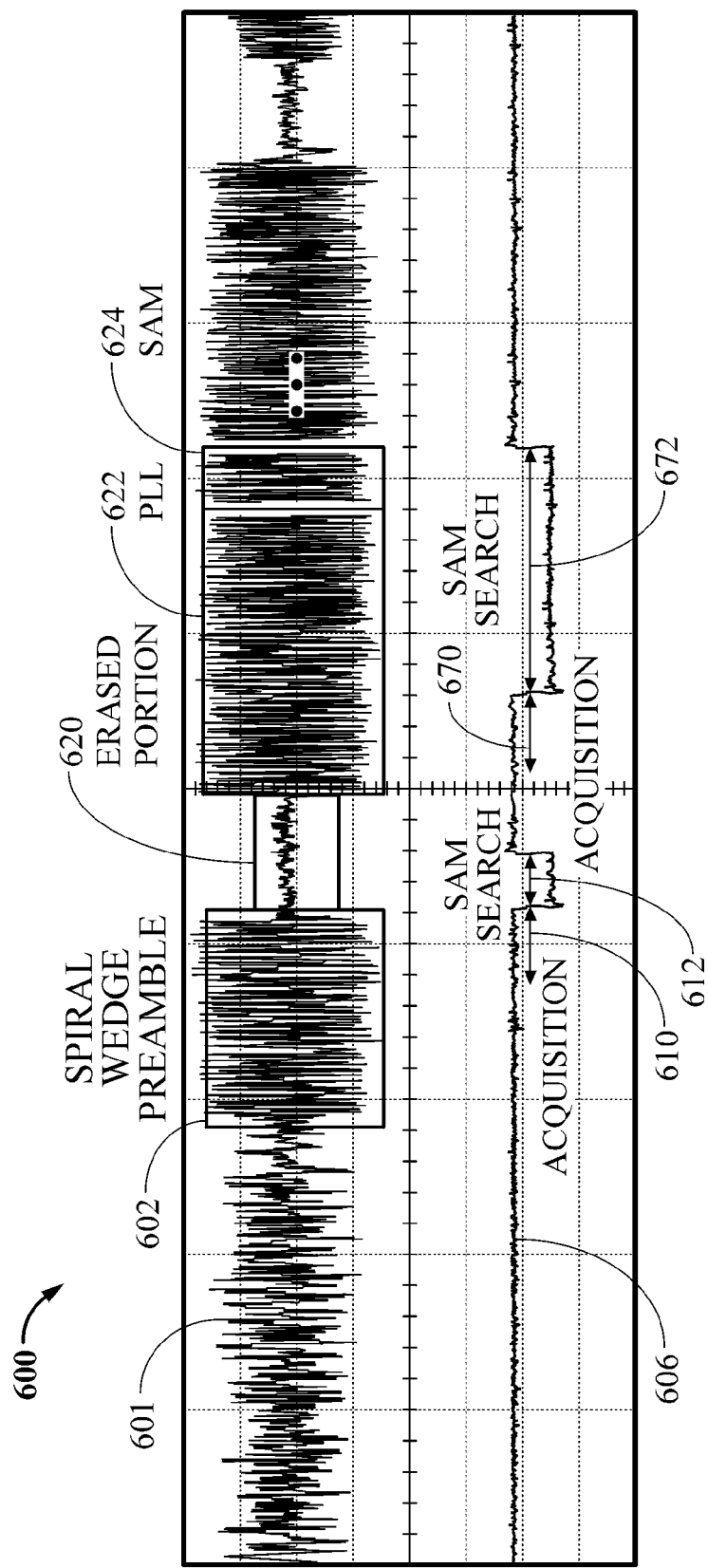
FIG. 6 is a signal representation graph illustrating an example servo field sync-up operation that utilizes a preamble qualification check during the SAM search loop, according to one embodiment of the invention.

FIG. 6 is a signal representation graph 600 illustrating an example servo field sync-up operation that utilizes a preamble qualification check during the SAM search loop, according to one embodiment of the invention. Again, as previously described, the top graph portion 601 includes example signals received by the read/write channel from the head as a servo sector is searched for during the servo field sync-up operation. Spiral wedge preamble 602, erased portion 620, PLL 622, and SAM 624 signals are received by the read/write channel. Servo field sync-up operation 606 that utilize a preamble qualification check, according to embodiments of the invention, is shown below.

Utilizing this process, a spiral wedge preamble 602 is detected, during acquisition period 610, and SAM search window 612 is opened. However, utilizing this type of servo field sync-up process 606 the presence of the preamble during the SAM search time period 612 is not detected and instead the erased portion 620 is detected. Because the preamble is no longer detected, and a SAM is not detected, the SAM search window 612 is closed.

Actual PLL 622 is then detected by the servo field sync-up process 606 during acquisition period 670 and a new SAM search window 672 is opened such that SAM 624 is successfully detected and the servo field sync-up operation is successful. Thus, SAM 624 is successfully detected and the servo sector is correctly identified such that proper servo seeking and tracking operations can then be employed.

Thus, as illustrated in FIG. 6, in servo field sync-up operation 606, the initial SAM search window 612 is terminated based upon a preamble qualification test in a short period of time such that another SAM search 672 may be initiated in a relatively quick fashion. It should be noted that the SAM search time period can be made extremely short such as 50 nano-seconds, 100 nano-seconds, 150 nano-seconds, 200 nano-seconds, 250 nano-seconds, etc., as compared to typical SAM search period time periods of at least 500 nano-second intervals.

Accordingly, embodiments of the invention enable a quick re-trigger of a SAM search following the detection of an invalid preamble pattern, such as by a spiral wedge, during the sync-up process. Thus, the servo field sync-up operation and the SAM search loop is made much more efficient.

The methods and processes previously described can be employed for disk drives with embedded servo systems. However, numerous alternatives for disk drives or other types of storage devices with similar or other media format characteristics can be employed by those skilled in the art to use the invention with equal advantage to implement these techniques. Further, although embodiments have been described in the context of a disk drive with embedded servo sectors, the invention can be employed in many different types of disk drives or other storage devices having a head that scans the media.

What is claimed is:

1. A method for detecting a servo address mark (SAM) of a servo sector of a disk during a servo field sync-up operation, the method comprising:
    detecting a start of a preamble;
    opening a SAM search window to detect the SAM; and
    continuing to detect the presence of the preamble during a SAM search time period, wherein:
        if the preamble is detected, continuing the SAM search window; and
        if the preamble is not detected, and the SAM is not detected, closing the SAM search window.

2. The method of claim 1, further comprising detecting the SAM.

3. The method of claim 2, wherein the SAM search window is closed.

4. The method of claim 1, wherein, if the SAM search time period times out, the SAM search window is closed.

5. The method of claim 1, wherein the preamble detected is from a spiral wedge.

6. The method of claim 1, wherein the preamble detected comprises a phase lock loop (PLL) field of the servo sector.

7. The method of claim 6, wherein the servo sector further includes at least one of a track identification (TKID) field and a sector identifier field.

8. The method of claim 7, wherein the servo sector further includes a group of servo bursts.

9. The method of claim 1, wherein the SAM search window is closed after less than 50 nano-seconds.

10. The method of claim 1, wherein the SAM search window to detect the SAM is opened in response to the detected preamble.

11. A disk drive comprising:
    a head to read servo sectors;
    a disk having a plurality of tracks, a substantial majority of the tracks having a plurality of servo sectors; and
    a read/write channel coupled to the head to implement operations to detect a servo address mark (SAM) of a servo sector of the disk during a servo field sync-up operation, the operation comprising:
    detecting a start of a preamble;
    opening a SAM search window to detect the SAM;
    continuing to detect the presence of the preamble during a SAM search time period, wherein:
        if the preamble is detected, continuing the SAM search window; and
        if the preamble is not detected, and the SAM is not detected, closing the SAM search window.

12. The disk drive of claim 11, further comprising the read/write channel detecting the SAM.

13. The disk drive of claim 12, further comprising the read/write channel closing the SAM search window.

14. The disk drive of claim 11, wherein, if the SAM search time period times out, the read/write channel closes the SAM search window.

15. The disk drive of claim 11, wherein the preamble detected is from a spiral wedge.

16. The disk drive of claim 11, wherein the preamble detected comprises a phase lock loop (PLL) field of the servo sector.

17. The disk drive of claim 16, wherein the read/write channel further includes at least one of a track identification (TKID) field and a sector identifier field.

18. The disk drive of claim 17, wherein the servo sector further includes a group of servo bursts.

19. The disk drive of claim 11, further comprising the read/write channel closing the SAM search window after less than 50 nano-seconds.

20. The disk drive of claim 11, further comprising the read/write channel opening the SAM search window to detect the SAM in response to the detected preamble.

21. A disk drive comprising:
    a disk having a plurality of tracks, a substantial majority of the tracks having a plurality of servo sectors;
    means for detecting a start of a preamble of a servo sector of the disk;
    means for opening a SAM search window to detect the SAM; and
    means for continuing to detect the presence of the preamble during a SAM search time period, wherein:
        if the preamble is detected, continuing the SAM search window; and
        if the preamble is not detected, and the SAM is not detected, closing the SAM search window.

22. The disk drive of claim 21, further comprising means for detecting the SAM.

23. The disk drive of claim 22, further comprising means for closing the SAM search window.

24. The disk drive of claim 21, wherein, if the SAM search time period times out, means for closing the SAM search window.

25. The disk drive of claim 21, wherein the preamble detected is from a spiral wedge.

26. The disk drive of claim 21, wherein the preamble detected comprises a phase lock loop (PLL) field of the servo sector.

* * * * *